United States Patent [19]

Mullenberg

[11] Patent Number: 5,639,176

[45] Date of Patent: Jun. 17, 1997

[54] CLAMPING SET

[76] Inventor: Ralph Mullenberg, Im Wiesengrund 6, D-41516 Grevenbroich, Germany

[21] Appl. No.: 512,457

[22] Filed: Aug. 8, 1995

[30] Foreign Application Priority Data

Feb. 8, 1995 [DE] Germany ............... 29501992 U

[51] Int. Cl.$^6$ .................................................. F16D 1/06
[52] U.S. Cl. ..................... 403/282; 403/368; 403/370; 403/374
[58] Field of Search ...................... 403/370, 371, 403/248, 249, 250, 277, 16, 369, 367, 368, 282

[56] References Cited

U.S. PATENT DOCUMENTS

| | | | |
|---|---|---|---|
| 3,847,495 | 11/1974 | Peter et al. ........................ | 403/370 |
| 3,849,015 | 11/1974 | Peter et al. ........................ | 403/371 X |
| 3,958,888 | 5/1976 | Mullenberg ....................... | 403/13 |
| 4,025,213 | 5/1977 | Schafer et al. ..................... | 403/370 |
| 4,186,570 | 2/1980 | Pokrandt .......................... | 403/370 X |
| 4,229,117 | 10/1980 | Coppin et al. ..................... | 403/370 |
| 4,268,185 | 5/1981 | Mullenberg ....................... | 403/16 |
| 4,411,551 | 10/1983 | Adelbratt ......................... | 403/370 |
| 4,902,635 | 2/1990 | Mullenberg ....................... | 403/368 X |

FOREIGN PATENT DOCUMENTS

| | | | |
|---|---|---|---|
| 2734784 | 1/1979 | Germany . | |
| 3343446 | 4/1985 | Germany ........................... | 403/370 |

OTHER PUBLICATIONS

Bikon Sales Brochure, Oct. 1991.

*Primary Examiner*—Kenneth J. Dorner
*Assistant Examiner*—Harry C. Kim
*Attorney, Agent, or Firm*—Vickers, Daniels & Young

[57] ABSTRACT

A clamping arrangement designed to join an outer component having a cylindrical recess to an inner component having a cylindrical outer peripheral surface which is concentrically arranged in the cylindrical recess. The clamping arrangement includes an inner cone element, an outer cone element and a center cone ring which cooperates with one another to clamp the inner component in the cylindrical recess.

33 Claims, 1 Drawing Sheet

CLAMPING SET

The present invention relates to the art of clamping and more particularly to a clamp designed to join a cylindrically shaped object in a cylindrically shaped recess.

BACKGROUND OF THE INVENTION

Clamping sets designed to clamp cylindrical bodies in cylindrical recesses are known in the art. One such clamping set is disclosed in DE 27 34 784 C2. The known clamping set has proven itself in the creation of high radial clamping forces with automatic disconnection after loosening of the tightening screws. However, it was observed in some cases at low friction coefficients on the cone surfaces that the center cone ring, which under some circumstances experiences plastic deformation at high torques, is forced out between the neighboring cone elements in the axial direction toward the apex of the cone surfaces.

Due to the problems associated with clamping in environments with a low friction coefficient, there has developed a need for a clamping set that provides high radial clamping forces in low friction coefficient arrangements and resists deformation of the clamping set components when high torques are applied to the components.

SUMMARY OF THE INVENTION

The present invention pertains to an improvement over prior clamping sets and incorporates a design and arrangement which overcomes the past deficiencies of prior clamping sets. The present invention pertains to a clamping set for joining of an outer component having a cylindrical recess, such as a hub, to an inner component, such as a shaft, having a cylindrical outer peripheral surface and arranged concentrically to the recess. The clamping set includes an inner cone element having an outer peripheral surface formed as a cone surface, an outer cone element having an inner peripheral surface formed as a cone surface, and a center cone ring with inner and outer peripheral surfaces formed as cone surface. The center cone ring is designed to have the same taper angle with the outer and inner cone surfaces of the inner and outer cone elements. The inner and outer cone elements and the center ring cooperate by axial sliding and form with them a cone surface pair in which the vertices of the cone surfaces of the center cone ring are positioned axially on the same side of cone ring and the taper angle of one cone surface pair with an angular distance from the self-locking angle lies in the self-locking range, while the taper angle of the other cone surface pair lies above the self-locking range. Axial set screws are preferably used to axially tighten the center cone against the inner and outer cone element. At least one recess is provided in at least one of the cone surfaces. The recess is preferably edged completely around the cone surface.

The edged recess should therefore not be a slit passing through the plane running through the axis, as is often encountered in cone clamping arrangements to facilitate deformation of the cone rings. The recess should instead have at least one, but normally two walls extending in the peripheral direction or arched wall parts extending essentially in the longitudinal direction. This has the effect that the cone surface neighboring the recess, which has no recess, is forced slightly into the recess under the very high radial pressures so that increased friction resistance occurs on the edges of the recess running essentially in the peripheral direction, which prevents displacement of the center cone ring in the axial direction relative to the cone element having the neighboring cone surface.

It has been shown that squeezing out of the center cone ring between the two neighboring cone elements can be reliably prevented with the clamping arrangement according to the invention even in cone surface pairs having low friction coefficients.

In order to create definite force conditions the clamping set is designed to include an axial stop for the end of center cone ring. The axial stop is designed to have a more limited wall thickness on the cone element and has a taper angle lying above the self-locking range and the radii of the cone surfaces with the larger taper angle dimensioned so that a point during the tightening of the set screws, the center cone ring lies against the stop with ends and at the same time lies against the opposite cone surface with the cone surface. The center cone ring is initially positioned during tightening against the stop on the cone element with the larger taper angle. This cone element and the center cone ring act from then on as a unit, against which the cone element having the smaller taper angle is then moved only in the axial direction.

In the preferred variant the recess is provided in at least one of the cone surfaces of the center cone ring.

The recess can be formed, in particular, by an edged radial opening of the center cone ring that goes all the way around, which is simple to produce and can be formed by a radial hole of the center cone ring or a milled groove radially positioned in the center cone ring.

A significant effect is already achieved if only a recess is present in the center cone ring.

In particular, for reasons of uniform distribution of forces and deformations, however, it can be advisable to provide several recesses evenly distributed around the periphery.

In summary, the present invention pertains to a clamping set for joining of an outer component having a cylindrical recess to an inner component having a cylindrical outer peripheral surface and arranged concentrically to the recess. The clamping set preferably includes an inner cone element with an outer peripheral surface formed as a cone surface, an outer cone element with an inner peripheral surface formed as a cone surface, and a center cone ring with inner and outer peripheral surfaces formed as cone surfaces. The center cone ring is preferably designed to have the same taper angle with the outer and inner cone surfaces of the inner and outer cone elements. The cone elements and cone ring preferably cooperate by axial sliding and form a cone surface pair in which the vertices of the cone surfaces of the center cone ring are positioned axially on the same side of cone ring and the taper angle of one cone surface pair and having an angular distance from the self-locking angle lies in the self-locking range, while the taper angle of the other cone surface pair lies above the self-locking range. Preferably, axial set screws are used to axially tighten the center cone against the inner and outer cone element. At least one recess is preferably provided in at least one of the cone surfaces. The recess is preferably edged completely around the cone surface. Preferably, the clamp set includes an axial stop for the center cone ring. The axial stop preferably is positioned at the end of center cone ring. The axial stop is designed to preferably have a more limited wall thickness on the cone element, have a taper angle lying above the self-locking range. The radii of the cone surfaces with the larger taper angle are dimensioned so that at a point during tightening of the set screws, the center cone ring lies against the stop with ends and at the same time lies against the opposite cone surface with the cone surface. Preferably, the recess is provided in at least one of the cone surfaces of the center ring. Preferably, the recess is formed by a radial opening of
} the center cone ring edged all the way around. Preferably, the recess is formed by a radial hole of the center cone ring. Alternatively, the recess is formed by a radial groove of the center cone ring. Preferably, several recesses are provided uniformly distributed over the periphery of the center ring.

BRIEF DESCRIPTION OF THE DRAWINGS

Reference may now be made to the drawings, which illustrate various embodiments that the invention may take in physical form and in certain parts and arrangements of parts wherein.

DETAILED DESCRIPTION OF PREFERRED EMBODIMENTS

Figure 1:
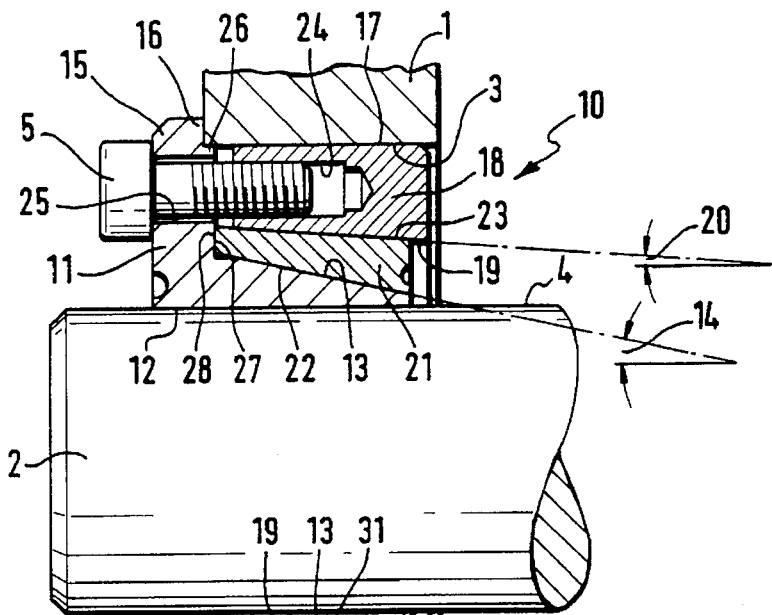
FIG. 1 illustrates a sectional view of the clamping set of the present invention.
Figure 2:
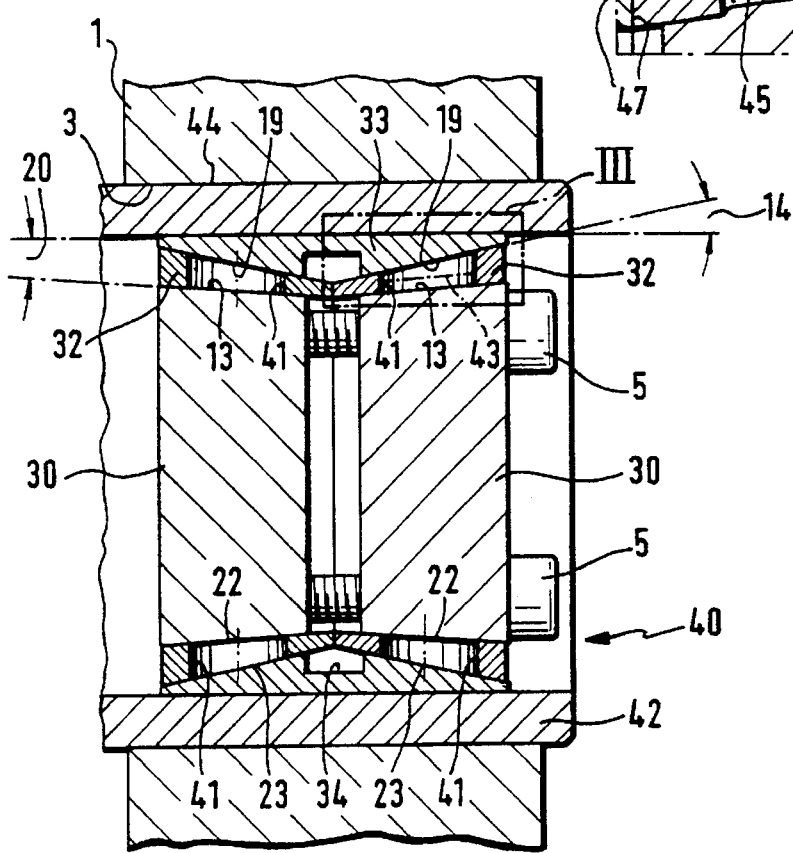
FIG. 2 illustrates a sectional view of an alternative embodiment of the present invention; and, FIG. 3 shows an enlarged depiction of the region III shown with the dash-dot line in FIG. 2.

Referring now to the drawings, wherein the showings are for the purpose of illustrating the preferred embodiments of the invention only and not for the purposes of limiting the same, FIGS. 1 and 2 illustrate two embodiments of the invention. In both embodiments the outer component is designated 1. It can be the hub of a gear or other wheel, also the wall of a drive pulley for conveyor belts or the like. The outer component 1 is attached to a shaft 2 or 42 by means of different versions of the clamping set. The outer component has a cylindrical recess 3, the shaft a cylindrical peripheral surface 4 or 44. In the variant according to FIG. 1 a space exists between them in which a clamping set 10 is accommodated. In FIG. 2 shaft 42 is a hollow shaft in which clamping set 40 is arranged and which lies with its outside periphery 44 in the cylindrical recess 3 of the outer component 1.

The clamping set of FIG. 1 denoted overall as 10 comprises an inner cone element in the form of an internal cone ring 11, which lies with its cylindrical inside peripheral surface 12 on the outside peripheral surface 4 of shaft 2. Cone ring 11 has on the outside a cone surface 13 with a taper angle 14 of about 12°, i.e., above the self-locking angle of about 7°. On the thick-walled end cone ring 11 has a radial flange 15 that projects far enough radially that it overlaps the edge of the outer component 1 at 16.

An outer cone element lies against the cylindrical recess 3 of the outer component 1 with the cylindrical outer peripheral surface 17 in the form of an outer cone ring 18 whose inner peripheral surface 19 is a cone surface with a taper angle 20 of about 3° lying within the self-locking range.

A center cone ring 21 carrying cone surfaces 22 and 23 on both peripheral sides corresponding to the cone surfaces 13 and 19, i.e., having the same taper angle and lying flat against them, is situated between cone rings 11 and 18. The cone surfaces 13, 22 and 19, 23 are arranged so that the vertices of the cone surfaces are situated on the same side of cone ring 10 (namely, the right side in FIG. 1).

Cone ring 18 has a threaded hole 24 on the side facing radial flange 15 into which a headed screw 5 can be screwed from the outside of radial flange 15 by passing through this in a hole 25. Several headed screws 5 are distributed evenly over the periphery. For the most part the headed screws are arranged as closely together as they can be.

As long as screws 5 are loose, the clamping set 10 forms a unit whose parts are intimately connected. After insertion into the space between space 2 and the outer component 1 fastening begins by tightening of set screws 5. To achieve centering it can be expedient if the radial flange 15 has a cylindrical projection 26 that precisely fits into cylindrical recess 3. In this fashion slumping of outer component 1 on shaft 2 is avoided, which inhibits uniform concentric fastening.

During tightening of set screws 5 the cone ring 18 moves axially against radial flange 15 and in so doing entrains center cone ring 21. The radial flange 15 forms with its surface positioned against cone rings 18, 21 and directly perpendicular to the axis a stop 27 against which after a certain displacement of center cone ring 21 in the axial direction its end 28 stops. The dimension of the radii of cone surfaces 13, 22 is such that these cone surfaces then also lie against each other. From this clamping point the cone rings 11 and 21 form a unit whose parts are undisplaceable against each other during further tightening of set screws 5.

Since the set screws 5 act between cone rings 11 and 18, subsequent clamping occurs as if only a two-part clamping set were involved with a taper angle 20 lying in a self-locking range. Cone ring 18 can therefore be tightened up to achievement of a significant radial pressing force on the center cone ring 21.

To loosen the clamping set 10 the set screws 5 are loosened. Owing to the taper angle 14 lying above the self-locking range, the cone rings 21 and 18 loosen as a unit without requiring forcing screws with corresponding dimensioning.

In order for cone rings 11, 18, 21 not to exhaust the clamping force of set screws 5, it is recommended that all cone rings be notched in a plane passing through the axis.

If the set screws 5 are very strongly tightened and the cone surfaces 13, 22 and 19, 23 are provided with a highly effective lubricant, it can happen that the center cone ring 21 is forced out between the outer cone rings 11 and 18 rightward according to FIG. 1, i.e., in the direction of the vertex of cone surfaces 13, 22 and 19, 23 between cone rings 11, 18.

In order to prevent this, the center cone ring 21 has a radially continuous groove 31, but edged all the way around in the peripheral surface, whose longer extent can run in the peripheral direction or also parallel to the axial direction. Under significant radial forces the cone surfaces 13 and 19 adjacent to groove 31 are forced somewhat into the clear cross section of groove 31.

It was surprisingly found that in this fashion the center cone ring 21 can be blocked in the axial direction so that undesired squeezing out rightward according to FIG. 1 does not occur.

To the extent that parts functionally corresponding to FIG. 1 are present in FIG. 2 the reference numbers are the same.

While the clamping set 10 is arranged in the radial space between outside periphery of shaft 2 and the inside periphery of outer component 1, shaft 42 in FIG. 2 is a hollow shaft that lies in the cylindrical recess 3 of outer component 1 with its cylindrical outer periphery 44. For this reason, there is no intermediate space between shaft 42 and outer component 1. The clamping set 40 is rather arranged in the interior of hollow shaft 42 and widens it radially in order to produce friction closure between the outer periphery 44 of hollow shaft 42 and the outer component 1.

The clamping set 40 is designed as a double-cone clamping set and has two oppositely arranged inner cone elements in the form of cone disks 30 having on their outer periphery cone surfaces 13 with the angle lying below the self-locking range, these disks being pulled toward one another in the axial direction by set screws 5. The cone surfaces 13 face each other with the smaller radii. Two double-cone rings 32 corresponding to the cone ring 21 in FIG. 1 are arranged on cone disks 30. The outer cone element is a double-cone ring with a taper angle 14 lying above the self-locking range, having two cone surfaces 19 arranged so that the greatest wall thickness of the double-cone ring 33 lies in the center.

The cone rings 32 have radial holes 41 closed all the way around with hole axes passing through the axis of the cone elements perpendicular to them, two of which are shifted by 180° one relative to the other. The holes 41 have the same blocking effect as the holes 31 in FIG. 1.

The grooves 31 or holes 41 need not absolutely pass through the entire wall thickness of the center cone ring 21 or 32. To achieve the intended effect it would also be theoretically sufficient if only flat recesses were provided, as indicated by the dash-dot line in FIG. 2 at 43. However, it is understood that use of a through-hole 41 is much simpler than machining of a flat recess 43, especially on the inside of cone ring 32.

Figure 3:
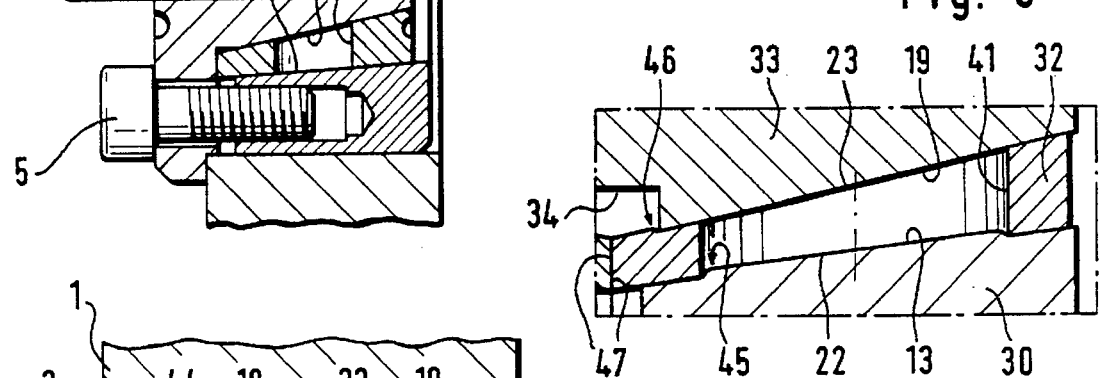

The action of the invention is indicated schematically in FIG. 3, which depicts the region III shown in the upper right of FIG. 2 in enlarged fashion. It is apparent that the cone surface 13 is forced into the clear cross section of radial hole 41 under the prevailing high pressure. The depiction in FIG. 3 is exaggerated for clarity. At position 45, at which the hole wall runs roughly in the peripheral direction, blocking that prevents squeezing out of cone ring 32 rightward occurs by the formed elevation of cone surface 13.

The double-cone ring 33 has a peripheral groove 34 on its internal peripheral surface 19, 19 in the center that reduces the cross section and this peripheral groove leads to an additional blocking effect when clamping set 40 is tightened at the position 46 corresponding in action to position 45.

The smaller front sides 47 of center cone ring 32 positioned in the region of groove 34 lie against each other axially and form mutual stops corresponding to stop 27 in FIG. 1.

The invention has been described with reference to a preferred embodiment and alternates thereof. It is believed that many modifications and alterations to the embodiments disclosed will readily suggest themselves to those skilled in the art upon reading and understanding the detailed description of the invention. It is intended to include all such modifications and alterations insofar as they come within the scope of the present invention.

I claim:

1. A clamping set for joining an outer component having a cylindrical recess to an inner component having a cylindrical outer peripheral surface and arranged concentrically to said recess comprising an inner element including a tapered outer surface, an outer element including a tapered inner surface, a center element including a tapered inner surface and a tapered outer surface, said tapered inner surface of said center element forming a complementary surface with said tapered outer surface of said inner element and said tapered outer surface of said center element forming a complementary surface with said tapered inner surface of said outer element, connection means for tightening the center element between said inner and outer elements and at least one element recess, said at least one element recess positioned on at least one of said surfaces of said elements, said element recess adapted to receive a deformed surface adjacent to said element recess under high radial pressures on said center element thereby locking said center element in position.

2. A clamping set as defined in claim 1, wherein said inner surface and said outer surface of said center element have tapered angles which are different.

3. A clamping set as defined in claim 2, wherein said tapered inner surface of said center element has said tapered angle which is greater than said tapered angle of said tapered outer surface of said center element.

4. A clamping set as defined in claim 3, wherein the larger tapered angle is greater than a self-locking angle of at least about seven degrees and the smaller tapered angle is less than the self-locking angle.

5. A clamping set as defined in claim 2, wherein the larger tapered angle is greater than a self-locking angle of at least about seven degrees and the smaller tapered angle is less than the self-locking angle.

6. A clamping set as defined in claim 5, wherein said self-locking angle is greater than seven degrees.

7. A clamping set as defined in claim 5, wherein said connection means includes axial set screws.

8. A clamping set as defined in claim 5, wherein said at least one element recess is a groove.

9. A clamping set as defined in claim 8, wherein said at least one element recess is on said center element.

10. A clamping set as defined in claim 5, wherein said at least one element recess is a hole.

11. A clamping set as defined in claim 5, wherein said at least one element recess is on said center element.

12. A clamping set as defined in claim 5, including an axial stop positioned on a component selected from the group consisting of said inner element or said outer element, said axial stop adapted to limit axial movement of said center element.

13. A clamping set as defined in claim 2, wherein said connection means includes axial set screws.

14. A clamping set as defined in claim 13, including an axial stop positioned on a component selected from the group consisting of said inner element or said outer element, said axial stop designed to limit axial movement of said center element.

15. A clamping set as defined in claim 1, wherein said at least one element recess is a groove.

16. A clamping set as defined in claim 15, including an axial stop positioned on a component selected from the group consisting of said inner element or said outer element, said axial stop designed to limit axial movement of said center element.

17. A clamping set as defined in claim 1, wherein said at least one element recess is a hole.

18. A clamping set as defined in claim 17, wherein said at least one element recess is on said center element.

19. A clamping set as defined in claim 17, including an axial stop positioned on a component selected from the group consisting of said inner element or said outer element, said axial stop designed to limit axial movement of said center element.

20. A clamping set as defined in claim 1, wherein said at least one element recess is on said center element.

21. A clamping set as defined in claim 20, including an axial stop positioned on a component selected from the group consisting of said inner element or said outer element, said axial stop designed to limit axial movement of said center element.

22. A clamping set for joining an outer component having a recess and a recess axis to an inner component having an outer surface, said clamping set comprising an inner element, an outer element, a center element, at least one element recess and a connection arrangement adapted to tighten said center element between said inner element and said outer element thereby causing high radial pressure to be applied to said center element, said inner element including an inner surface for engagement with said inner component and a tapered outer surface for engagement with at least substantially complementary tapered inner surface of said center element, said outer element including an outer surface for engagement with said outer component and a tapered inner surface for engagement with at least substantially complementary tapered outer surface of said center element, said at least one element recess positioned on at least one of said surfaces of said elements, said at least one element recess adapted to receive a deformed surface adjacent to said recess during high radial pressure on said center element thereby locking said center element in position.

23. A clamping set as defined in claim 22, wherein said tapered surfaces on said center element are tapered at different angles, one of said tapered angles is greater than a self-locking angle of at least about seven degrees and the other of said tapered angle is less than said self-locking angle.

24. A clamping set as defined in claim 22, wherein said at least one element recess including a groove, said groove at least partially positioned in a non-parallel relationship to said recess axis.

25. A clamping set as defined in claim 24, wherein said at least one element recess is positioned on said center element.

26. A clamping set as defined in claim 25, including an axial stop positioned on a component selected from the group consisting of said inner element or said outer element, said axial stop adapted to limit axial movement of said center element in said recess axis.

27. A clamping set as defined in claim 22, wherein said at least one element recess is positioned on said center element.

28. A clamping set as defined in claim 27, wherein a second element recess is positioned on said outer element.

29. A clamping set as defined in claim 28, wherein said at least one element recess extends at least substantially completely about the peripheral surface of said center element.

30. A clamping set as defined in claim 22, including an axial stop positioned on a component selected from the group consisting of said inner element or said outer element, said axial stop adapted to limit axial movement of said center element in said recess axis.

31. A clamping set as defined in claim 30, wherein said inner element includes said axial stop, said tapered outer surface of said inner element having a tapered angle greater than a self-locking angle of at least about seven degrees and having a length which terminates at said axial stop, said length of said tapered outer surface of said inner element substantially the same length of said tapered inner surface of said center element.

32. A clamping set as defined in claim 30, wherein said outer element includes said axial stop, said tapered inner surface of said outer element having a tapered angle greater than a self-locking angle of at least about seven degrees and having a length which terminates at said axial stop, said length of said tapered inner surface of said outer element substantially the same length of said tapered outer surface of said center element.

33. A clamping set as defined in claim 22, wherein said at least one element recess is selected from the group consisting of a hole, a notch and a groove.

* * * * *